US012326246B2

(12) United States Patent
Hendler et al.

(10) Patent No.: US 12,326,246 B2
(45) Date of Patent: *Jun. 10, 2025

(54) LIGHT ASSEMBLY CONNECTOR FOR INSERTION INTO A LIGHTING TRACK

(71) Applicant: Diem GmbH, Graz (AT)

(72) Inventors: Rene Hendler, Stattegg (AT); Stefan Krotmeier, New York, NY (US)

(73) Assignee: Diem GmbH, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,211

(22) Filed: May 3, 2024

(65) Prior Publication Data

US 2024/0280250 A1 Aug. 22, 2024

Related U.S. Application Data

(63) Continuation of application No. 18/103,950, filed on Jan. 31, 2023, now Pat. No. 12,000,577, which is a (Continued)

(51) Int. Cl.

*F21V 23/06* (2006.01)
*F21S 8/06* (2006.01)
(Continued)

(52) U.S. Cl.

CPC .............. *F21V 23/06* (2013.01); *F21S 8/066* (2013.01); *F21V 21/35* (2013.01); *H01R 25/14* (2013.01); *H01R 25/142* (2013.01)

(58) Field of Classification Search

CPC .......... F21V 23/06; F21V 8/066; F21V 21/35; H01R 25/14; H01R 25/142
See application file for complete search history.

(56) References Cited

U.S. PATENT DOCUMENTS 3,832,503 A 8/1974 Crane
4,475,226 A 10/1984 Greenberg
(Continued)

FOREIGN PATENT DOCUMENTS

DE 2327078 A1 12/1973
DE 102006022640 A1 11/2007
(Continued)

*Primary Examiner* — Travis S Chambers
(74) *Attorney, Agent, or Firm* — Davidson Kappel LLC

(57) ABSTRACT

A lighting assembly connector is configured for being inserted into a lighting track. The lighting assembly connector includes a casing having a width defining a lateral direction and a length defining longitudinal direction. The length is greater than or equal to the width. The casing is definable as including three sections each defining one-third of the length. The three sections include a middle section, a first end section including a first longitudinal end of the casing and a second end section including a second longitudinal end of the casing. The middle section has a greater average width than each of the first end section and the second end section. The lighting assembly connector also includes a plurality of electrical contacts extending out of the casing each configured for contacting a respective line of the lighting track; and at least one fastener connected to the casing configured for removably connecting the lighting assembly connector to the lighting track.

16 Claims, 7 Drawing Sheets

Fig. 2

Related U.S. Application Data continuation of application No. 17/590,021, filed on Feb. 1, 2022, now Pat. No. 11,603,985, which is a continuation of application No. 17/150,838, filed on Jan. 15, 2021, now Pat. No. 11,287,122.

(51) Int. Cl.

*F21V 21/35* (2006.01)
*H01R 25/14* (2006.01)

(56) References Cited

U.S. PATENT DOCUMENTS

| | | | |
|---|---|---|---|
| 4,655,520 A | 4/1987 | Cummings et al. | |
| 4,676,567 A | 6/1987 | Mouchi et al. | |
| 4,822,292 A | 4/1989 | Thayer et al. | |
| 4,975,071 A | 12/1990 | Bedocs et al. | |
| 5,334,037 A | 8/1994 | Gabrius | |
| 5,855,485 A | 1/1999 | Patti et al. | |
| 6,079,992 A | 6/2000 | Kuchar et al. | |
| 6,634,895 B2 | 10/2003 | Agro et al. | |
| 6,979,097 B2 | 12/2005 | Elam | |
| 7,137,727 B2 | 11/2006 | Joseph et al. | |
| 7,507,005 B1 | 3/2009 | Mier-Langer et al. | |
| 7,654,834 B1 | 2/2010 | Mier-Langer | |
| 8,899,999 B2 | 12/2014 | Mackiewicz et al. | |
| 9,136,659 B2 | 9/2015 | Fishman et al. | |
| 9,429,282 B2 | 8/2016 | Fruhm | |
| 9,822,940 B2 | 11/2017 | Bergman et al. | |
| 10,527,272 B2 | 1/2020 | Layne et al. | |
| 10,539,308 B2 | 1/2020 | Bernanrd et al. | |
| 10,660,172 B2 | 5/2020 | Ernst et al. | |
| 10,985,478 B1 | 4/2021 | Leahy et al. | |
| 11,287,122 B1 | 3/2022 | Hendler et al. | |
| 11,635,193 B1 * | 4/2023 | Lee | F21S 8/038 362/362 |
| 11,658,428 B1 * | 5/2023 | Leahy | H01R 9/2416 439/110 |
| 2007/0153550 A1 | 7/2007 | Lehman et al. | |
| 2008/0090432 A1 | 4/2008 | Patterson et al. | |
| 2011/0141749 A1 | 6/2011 | Fishman et al. | |
| 2020/0149611 A1 | 5/2020 | Yu et al. | |

FOREIGN PATENT DOCUMENTS

| | | |
|---|---|---|
| DE | 102014003109 B4 | 10/2015 |
| EP | 0271286 B1 | 4/1993 |
| EP | 2556568 B1 | 6/2018 |
| EP | 3388743 A1 | 10/2018 |
| EP | 3723213 A1 | 10/2020 |
| WO | WO9534783 A1 | 12/1995 |
| WO | WO2006069049 A2 | 6/2006 |

* cited by examiner

LIGHT ASSEMBLY CONNECTOR FOR INSERTION INTO A LIGHTING TRACK

This is a Continuation of U.S. Ser. No. 18/103,950, filed on Jan. 31, 2023, which published as U.S. 2023/0175680 A1 on Jun. 8, 2023, which is a Continuation of U.S. patent application Ser. No. 17/590,021 filed Feb. 1, 2022 which issued as U.S. Pat. No. 11,603,985 on Mar. 14, 2023, which is a Continuation of U.S. patent application Ser. No. 17/150,838 filed on Jan. 15, 2021 which issued as U.S. Pat. No. 11,287,122 on Mar. 29, 2022. All of the above are hereby incorporated by reference herein.

The present disclosure relates generally to track lighting and more specifically to a light assembly connector for insertion into a lighting track.

BACKGROUND

U.S. Pat. Nos. 4,975,071 and 9,136,659 B2 disclose connectors for insertion into a lighting track.

SUMMARY

A lighting assembly connector is configured for being inserted into a lighting track. The lighting assembly connector includes a casing having a width defining a lateral direction and a length defining longitudinal direction. The length is equal to or greater than the width. The casing is definable as including three sections each defining one-third of the length. The three sections include a middle section, a first end section including a first longitudinal end of the casing and a second end section including a second longitudinal end of the casing. The middle section has a greater average width than each of the first end section and the second end section. The casing is electrically insulating. The lighting assembly connector also includes a plurality of electrical contacts extending out of the casing each configured for contacting a respective line of the lighting track; and at least one fastener connected to the casing configured for removably connecting the lighting assembly connector to the lighting track.

BRIEF DESCRIPTION OF THE DRAWINGS

The present invention is described below by reference to the following drawings, in which.

DETAILED DESCRIPTION

Figure 1:
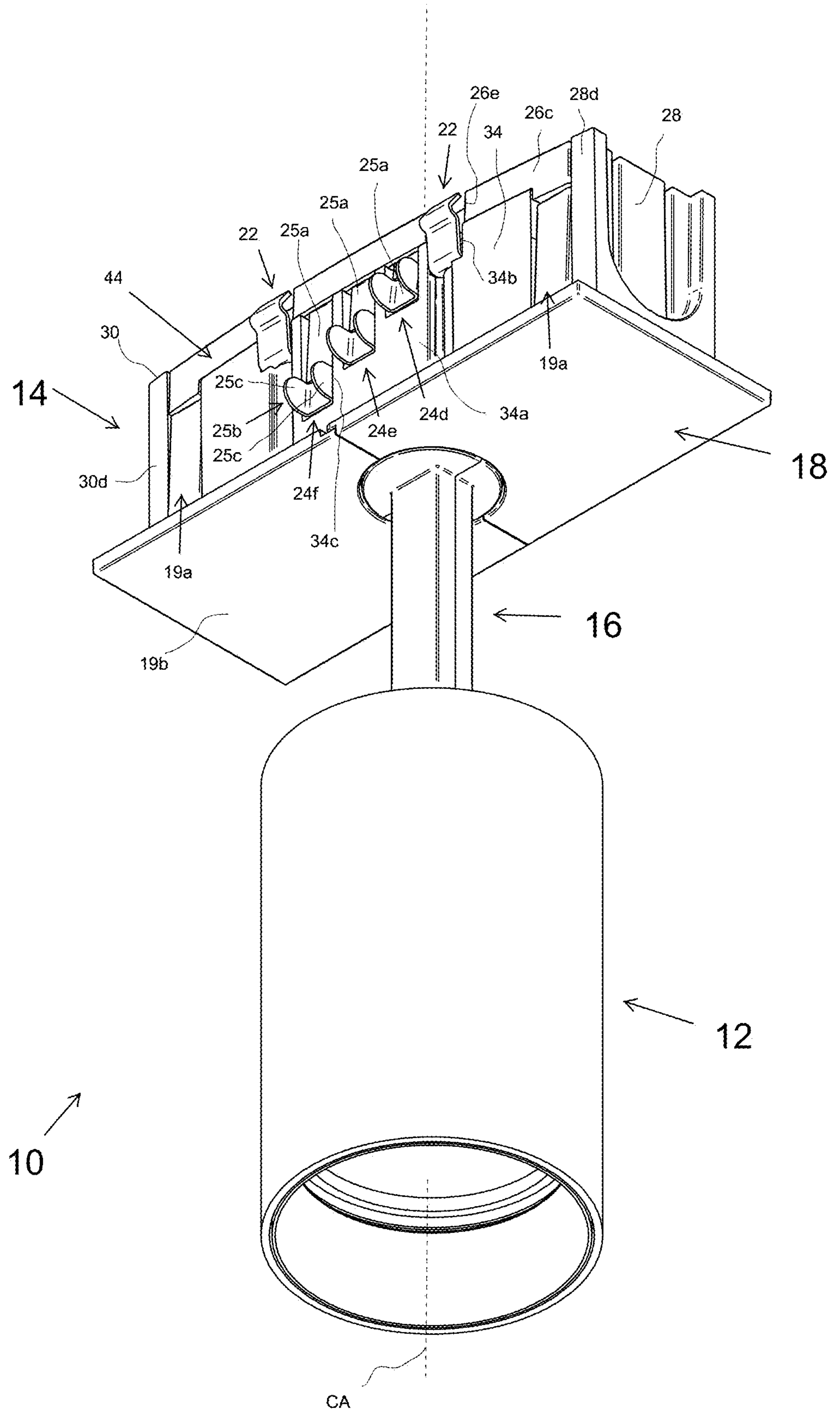
FIGS. 1 to 6 show different views of an exemplary light assembly in accordance with the present disclosure.

FIG. 1 shows an oblique upward facing view an exemplary light assembly 10 in accordance with the present disclosure. Light assembly 10 includes a light receptacle 12 receiving a light source, such as an LED, a connector 14 for insertion into a track of a track lighting system and a support section 16 connecting light receptacle 12 to connector 14. One end of support section 16 is fixed to light receptacle 12 and the other end of support section 16 is fixed to connector 14. Support section 16 encloses wiring for electrically connecting light receptacle to connector 14 such that connector 14 transmits electricity through support section 16 into light receptacle 12 to illuminate the light source housed within light receptacle 12. A rectangular cover 18 is provided at the interface between connector 14 and support section 16 that rests in the opening of the lighting track to obscure the connector 14 from view when connector 14 is inserted into a track. Light assembly 10 is centered on a vertically extending center axis CA that extends through light receptacle 12, support section 16 and connector 14. The terms axially, circumferential and radial, and derivatives thereof are used in reference to center axis CA, unless otherwise specified.

Figure 2:
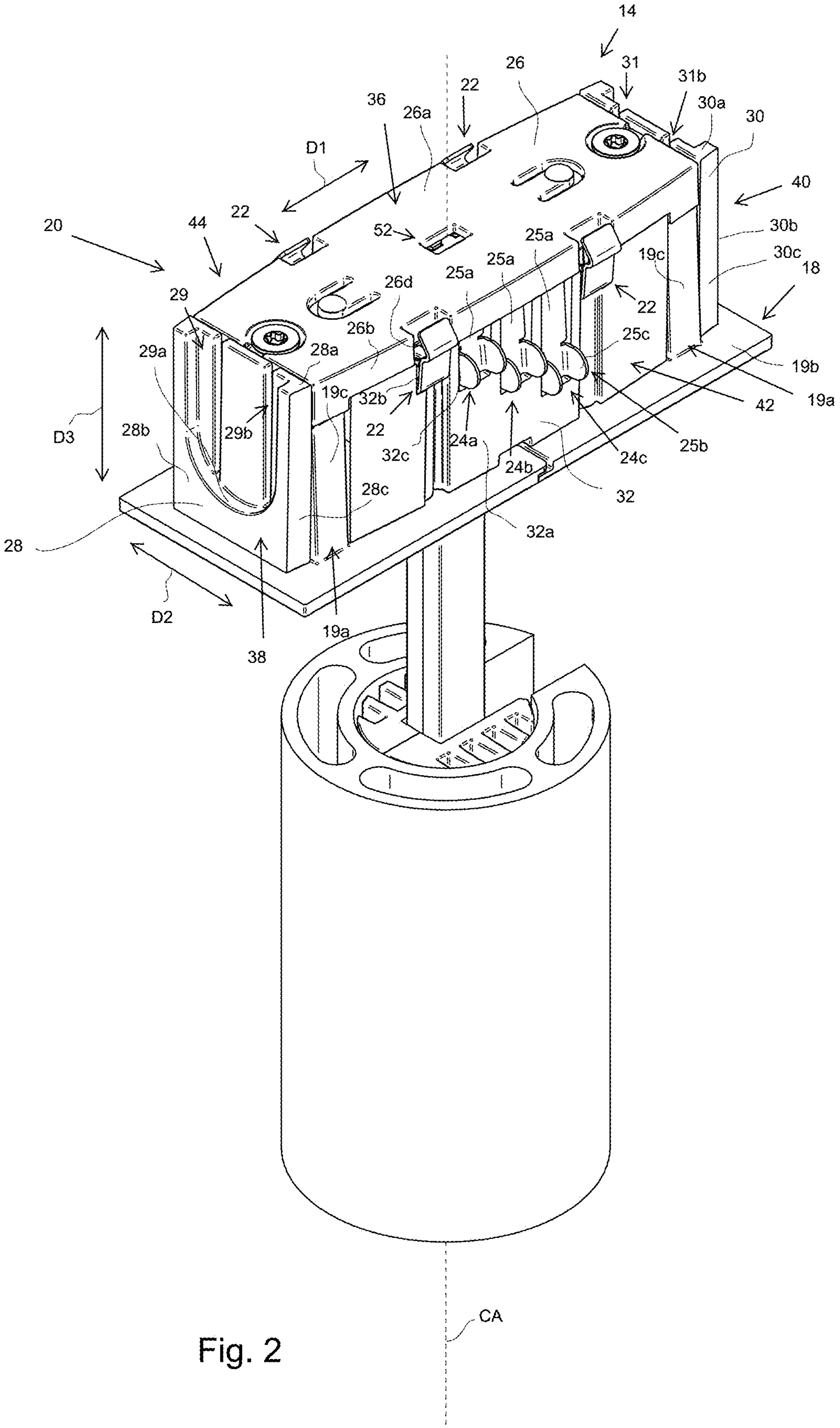

FIG. 2 shows an oblique downward facing view light assembly 10 showing further details of connector 14. Connector 14 has a three-dimensional shape such that a length of connector 14 is in a longitudinal direction D1 that is perpendicular to center axis CA, a width of connector 14 is in a lateral direction D2 that is also perpendicular to center axis CA and a height of connector 14 is in a direction D3 that is parallel to center axis. Connector 14 includes a casing 20, which is made of an electrically insulating material, for example plastic, a plurality of fasteners for removably fastening connector 14 to the track in the form of clips 22 extending outside of casing 20, and a plurality of electrical contacts 24*a* to 24*f* extending outside of casing 20 for electrically connecting connector 14 to electrical circuits of the track.

Casing 20 is defined by five outer exposed walls 26, 28, 30, 32, 34 (wall 34 is shown in FIG. 1) that are configured for being inserted into the track and define five sides 36, 38, 40, 42, 44 of casing 20. A sixth side of casing is joined with and covered by cover 18 and is obscured from view in FIG. 2. Casing 20 has a tapered shape in the longitudinal direction that allows connector 14 to be used with both a straight track and a curved track as discussed further below.

First side 36 defines an upper end face of casing 20, which is an upper end face of light assembly 10 for facing vertically into a track mounted on the ceiling. First side 36 is intersected by center axis CA and is opposite of the side of casing 20 that is covered by cover 18. In this example, cover 18 is snapped into casing 20 by four cover connectors in the form of prongs 19*a*—two on side 42 and two on side 44—that protrude vertically from a flat plate shaped base 19*b* of cover 18 between surfaces 31*a*, 34*a* of walls 32, 34 and surface 28*c*, 28*d*, 30*c*, 30*d* of walls 28, 30. First side 36 has outer dimensions that are defined by the length and width of connector 14. First side 36 is defined by an upper surface 26*a* of first wall 26, an upper surface 28*a* of a second wall 28 and an upper surface 30*a* of a third wall 30, with upper surface 26*a* defining a majority of first side 36.

Second and third sides 38, 40 define longitudinal ends of casing 20 and each have outer dimensions that are defined by the width and height of connector 14. Second and third sides 38, 40 are spaced equidistant from center axis CA. Second side 38 is defined by an end surface 28*b* of wall 28 and third side 38 is defined by an end surface 30*b* of wall 30.

Fourth and fifth sides 42, 44 define lateral sides of casing 20 and each have outer dimensions that are defined by the length and height of connector 14. Fourth side 42 is shown in FIG. 2 and fifth side 44 is shown in FIG. 1. Fourth and fifth sides 42, 44 are spaced equidistant from center axis CA. Fourth side 42 is defined by a lateral surface 28*c* of wall 28, a lateral surface 30*c* of wall 30, a lateral surface 26*b* of wall 26 and a surface 32*a* of wall 32. As shown in FIG. 1, fifth side 44 is defined by a lateral surface 28*d* of wall 28, a lateral surface 30*d* of wall 30, a lateral surface 26*c* of wall 26 and a surface 34*a* of wall 34.

Walls 28, 30 each include a respective recess 29, 31 formed in the respective surface 28*b*, 30*b* that define a respective edge 29*a*, 31*a*, which extends inward from the respective surface 28*b*, 30*b* in direction D1, for being gripped by a user's fingers to pull the connector 14 from the track. Surfaces 28*b*, 30*b* each have a U-shape such that edges 29*a*, 31*a* each have a U-shape. Walls 28, 30 also include slots 29*b*, 31*b*, respectively, for air passage into and out of an interior of the casing 20 for cooling the control unit inside of casing 20.

Clips 22 are provided on sides 42 and 44 of casing 20, with for example two clips 22 being provided on each of sides 42, 44. Each of clips 22 on side 42 extends through a respective slot 32*b* formed in wall 32 and a slot 26*d* formed in lateral surface 26*b* of wall 26 and, as shown in FIG. 1, each of clips 22 on side 44 extends through a respective slot 34*b* formed in wall 34 and a slot 26*e* formed in lateral surface 26*c* of wall 26. Clips 22 are flexible in direction D2 and pressed toward wall 26 when clips 22 are snapped into the track.

Electrical contacts 24*a* to 24*f* are also provided on sides 42 and 44 of casing 20, with three electrical contacts 24*a* to 24*c* being provided on each of side 42 and three electrical contacts 24*d* to 24*f* provided on side 44. Each of contacts 24*a* to 24*c* on side 42 extends through a respective slot 32*c* formed in wall 32 and each of contacts 24*d* to 24*f* on side 44 extends through a respective slot 34*c* formed in wall 34. Each of contacts 24*a* to 24*f* incudes a flat tab 25*a* within the plane of wall 32 and a protrusion 25*b* extending radially away from tab 25*a* and from wall 34 for contacting an electrical circuit in the track. Each of protrusions 25*b* includes two sections 25*c* that extend radially from opposite lateral edges of the respective tab 25*a* away from the respective tab 25*a*. The three contacts 24*a* to 24*c* on side 42 are all of different heights in direction D3 and the three contacts 24*d* to 24*f* on side 44 are all of different heights in direction D3 such that protrusions 25*b* on each side 42, 44 are each a different distance from a plane of surface 26*a* of first wall 26. In particular, of the three contacts 24*a* to 24*c* on side 42, referring to the view shown in FIG. 2, the contact 24*a* on the left is of the shortest height in direction D3, the contact 24*c* on the right is of the longest height in direction D3 and the contact 24*b* in the middle is of an intermediate height that is between the heights of the left contact 24*a* and the right contacts 24*c*. The three contacts 24*d* to 24*f* are configured in the same manner as contacts 24*a* to 24*c* and having varying heights such that each protrusion 25*b* on a respective one of sides 42, 44 has a unique vertical location. In other words, tabs 25*a* on each side 42, 44 are of different heights such that axial protrusions 25*b* on each side 42, 44 are different distances from the plane extending along the end face defined by side 36 and extending perpendicular to center axis CA. Accordingly, each axial protrusion 25*b* is configured to contact a different respective electrical contact of the track with each contact of the track having a unique height. A top end of each of tabs 25*a* on side 42 is provided at the bottom edge lateral side 26*b* of wall 26 and a top edge of wall 32 and a top end of each of tabs 25*a* on side 44 is provided at the bottom edge lateral side 26*c* of wall 26 and a top edge of wall 34.

Figure 3:
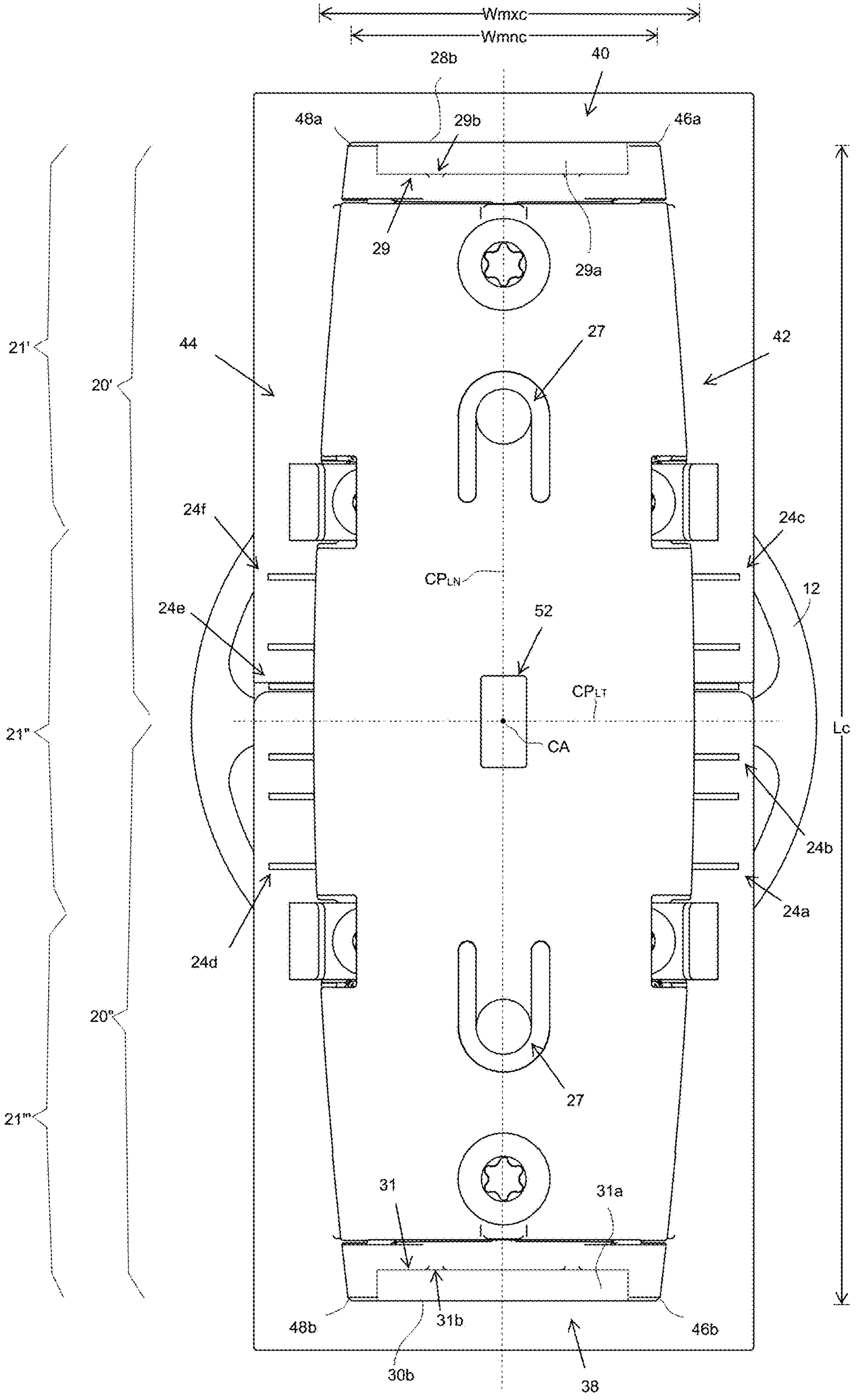
Figure 5:
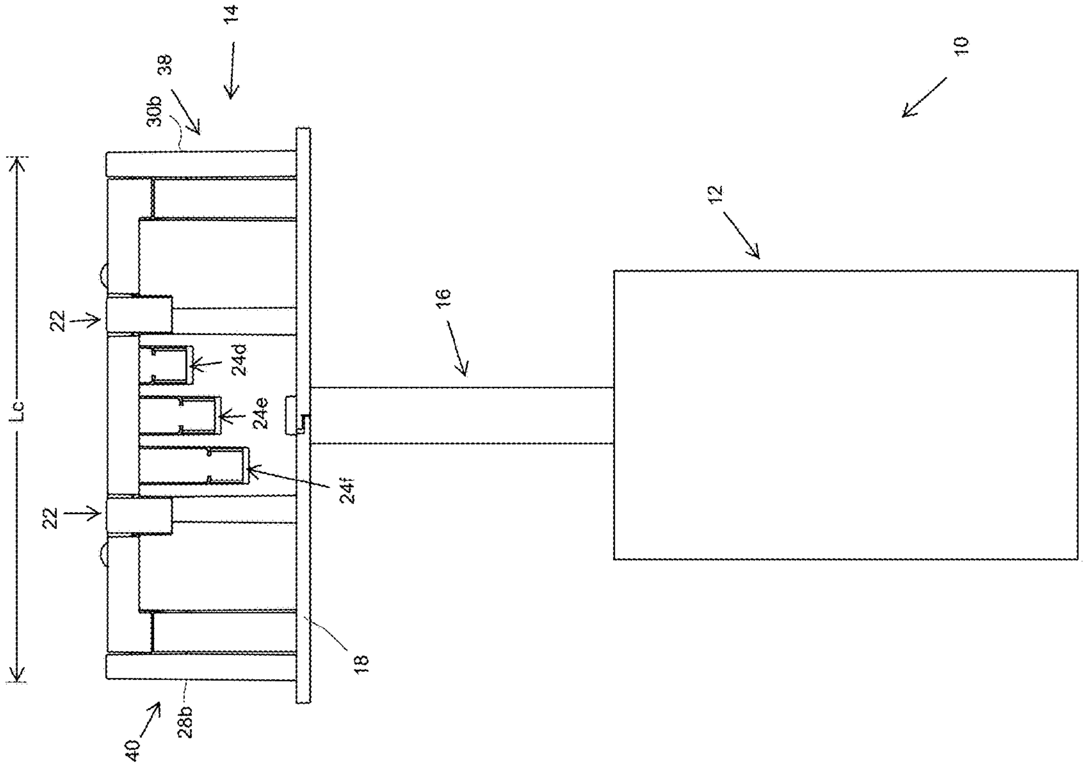
Figure 4:
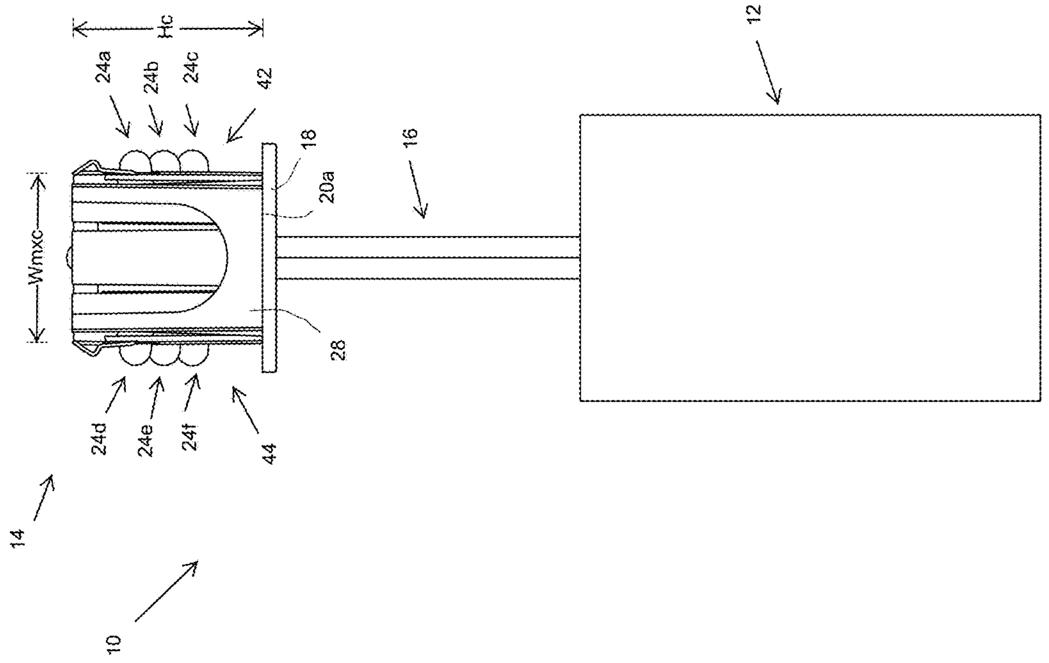

As clearly illustrated in FIGS. 3 to 5, casing 20 of connector 14 has a maximum length Lc that is greater than a maximum width Wmxc of casing 20 and is greater than a maximum depth Hc of casing 20. In other examples, the maximum length Lc may be equal to the maximum width Wmxc. FIG. 3 shows a top plan view of light assembly 10 facing the end face of connector 14 and the end face of light assembly 10, FIG. 4 shows an elevation side view illustrating connector 14 viewed longitudinally and FIG. 5 shows an elevation side view illustrating connector 14 viewed laterally.

The maximum length Lc of casing 20 is defined on one end by surface 28*b* and on the other end by surface 30*b*. The maximum height Hc of casing 20 is defined on one end by upper surface 26*a* and on the other end by surfaces 20*a* that join an upper surface 18*a* of cover 18.

A lateral center plane $CP_{LT}$ of casing 20 intersects and forms the lateral center of longitudinally extending sides 36, 42, 44 such that lateral center plane $CP_{LT}$ divides casing 20 into two half sections 20', 20". A longitudinal center plane $CP_{LN}$ of casing 20 intersects and forms the lateral center of laterally extending sides 38, 40 and longitudinally extending side 36. Both of lateral center plane $CP_{LT}$ and longitudinal center plane $CP_{LN}$ of casing 20 are coincident with center axis CA, and planes $CP_{LT}$ and $CP_{LN}$ intersect each other at center axis CA.

Casing 20 can further be defined as including three third section 21', 21", 21'" each defining one-third (⅓) of the length of casing 20. Section 21" defines a middle third of casing 20, while sections 21', 21'" define end thirds of casing 20. Sections 21', 21'" each include a longitudinal end of casing 20, with the longitudinal end of section 21' being defined by side 40 and the longitudinal end of section 21' being defined by side 38.

In order to allow connector 14 to be used with both a straight track and a curved track, middle section 21" have a greater average width than each of end sections 21', 21'". In the example shown in the figures, sections 21', 21'" each have a decreasing width while extending away from middle section 21 to the respective longitudinal end of casing 20. Further, in the example shown in the figures, each of longitudinally extending sides 42, 44 extending laterally toward longitudinal center plane $CP_{LN}$ while extending longitudinally away from lateral center plane $CP_{LT}$ to join sides 38, 40. More specifically, the maximum width Wmxc of casing 20 is at a lateral center plane $CP_{LT}$ of casing 20 and the minimum width Wmnc of casing 20 is at both of longitudinal end surfaces 28*a*, 30*a* with sides 42, 44 each being tapered while extending from lateral center plane $CP_{LT}$ to longitudinal end surface 28*a* and while extending from lateral center plane $CP_{LT}$ to longitudinal end surface 30*a*. Half section 20' becomes thinner while extending away from lateral center plane $CP_{LT}$ by surfaces of side 42 tapering while extending from lateral center plane $CP_{LT}$ to an edge 46*a* defining a transition from side 42 to side 40 and surfaces of side 44 tapering while extending from lateral center plane $CP_{LT}$ to an edge 48*a* defining a transition from side 44 to side 40. In the same manner, half section 20" becomes thinner while extending away from lateral center plane $CP_{LT}$ by surfaces of side 42 tapering while extending from lateral center plane $CP_{LT}$ to an edge 46*b*, which defines a transition from side 42 to side 38, and by surfaces of side 44 tapering while extending from lateral center plane $CP_{LT}$ to an edge 48*b*, which defines a transition from side 44 to side 38.

In other words, each of half sections 20', 20" of casing 20 has a decreasing width while extending longitudinally outward away from lateral center plane $CP_{LT}$. Each of sides 42, 44 of half section 20' is tapered toward longitudinal center plane $CP_{LN}$ of casing 20 while extending away from lateral center plane $CP_{LT}$ all the way to side 40. In the same manner, each of sides 42, 44 of half section 20" is tapered toward longitudinal center plane $CP_{LN}$ of casing 20 while extending away from lateral center plane $CP_{LT}$ all the way to side 40.

In the example shown, connector 14 is symmetrical with respect to lateral center plane $CP_{LT}$ such that sections 20', 20" are identical except for the different heights of contacts 24*a* and 24*c* and the different heights of contacts 24*d* and 24*f*, and connector 14 is also symmetrical with respect to longitudinal center plane $CP_{LN}$.

Electrical contacts 24*b*, 24*e* are provided at the longitudinal middle of connector 14 and intersected by lateral center plane $CP_{LT}$, contacts 24*c*, 24*f* are adjacent to electrical contacts 24*b*, 24*e*, respectively, in half section 20' and contacts 24*a*, 24*d* are adjacent to electrical contacts 24*b*, 24*e*, respectively, in half section 20". In the example shown in the figures, all of electrical contacts 24*a* to 24*f* are provided in the longitudinal center third section 21" of connector 14 such that contacts 24*a* to 24*f* are all arranged to contact the corresponding contacts of rails on both straight and curved tracks. Clips 22 are provided further away from lateral center plane $CP_{LT}$ than contacts 24*a* to 24*f* such that contacts 24*a* to 24*c* are provided between clips 22 on side 42 and contacts 24*d* to 24*f* are provided between clips 22 on side 44.

Wall 26 is provided with two integrated plastic springs 27 to balance the tolerances to help avoid wobbling when moved in the track. Each of springs 27 is in one respective half 20', 20" such that springs 27 are equidistant from center axis lateral center plane $CP_{LT}$. Springs 27 are each centered on longitudinal center plane $CP_{LN}$.

Figure 6:
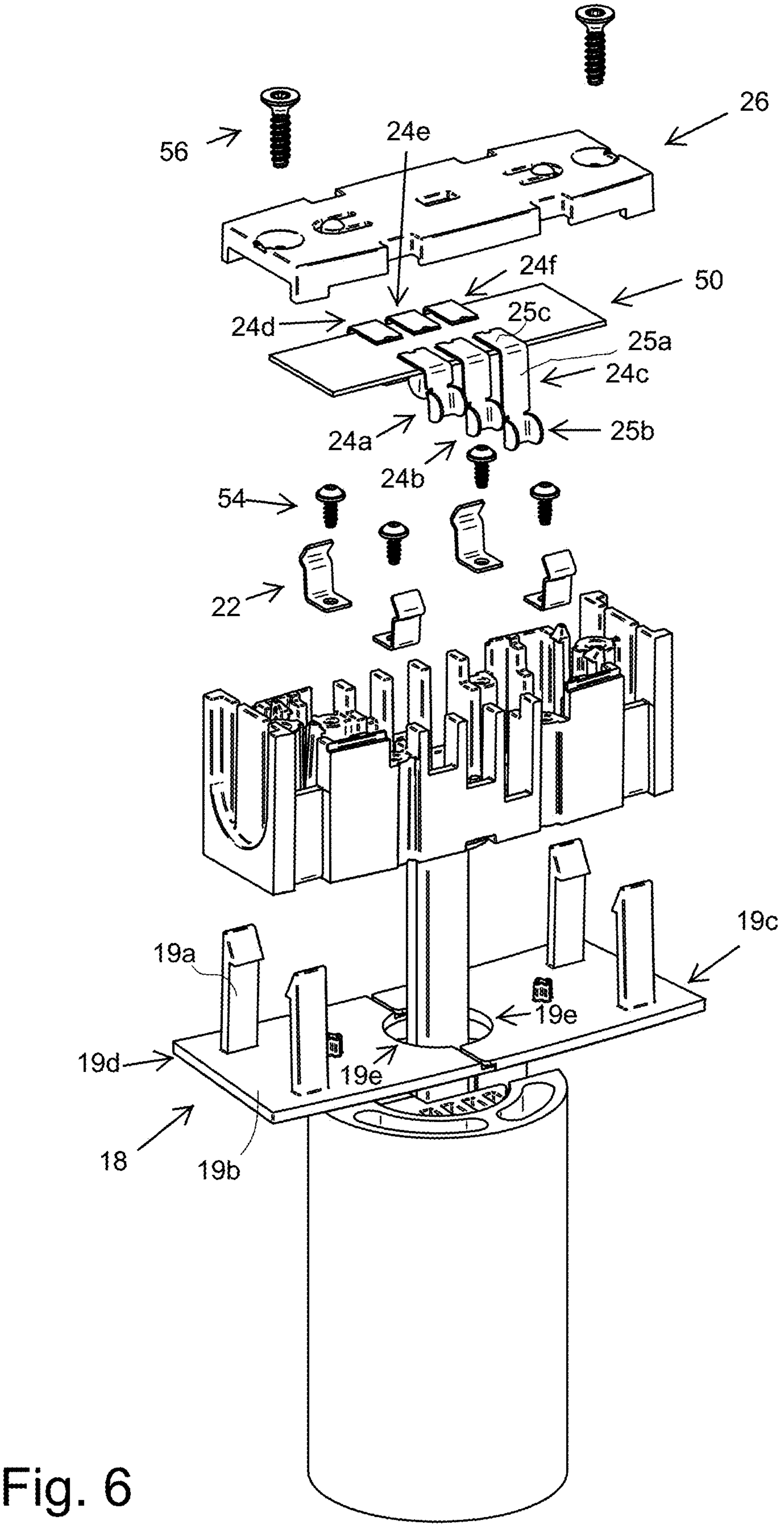

FIG. 6 shows light assembly 10 with an exploded view of connector 14. As illustrated in FIG. 6, clips 22 are each fixed to an interior of casing 20 by screws 54 and wall 26 is fixed to the interior of casing 20 by screws 56. Electrical contacts 24*a* to 24*f* are fixed to a control unit in the form of a circuit board 50. Tabs 25*a* of contacts 24*a* to 24*f* are each fixed to a respective base 25*c* that is fixed in electrical contact with circuit board 50. Circuit board 50 is configured for switching connector 14 between two different electrical circuits. A first circuit includes electrical contacts 24*a* to 24*c*, and a second circuit is formed by electrical contacts 24*d* to 24*f*.

More specifically, circuit board 50 is configured to switch the transmission of electricity from a two-circuit rail to the light source of light assembly 10 between two different sets of electrical contacts of connector 14—i.e., the first set of electrical contacts 24*a* to 24*c* or the second set of electrical contracts 24*d* to 24*f*. An operator may switch the electrical input into connector 14 by actuating a mechanical switch 52 (FIGS. 2 and 3) on side 26 of casing 20. Circuit board 50 is configured so that, for each set of electrical contacts 24*a* to 24*c* and 24*d* to 24*f*, a first contact is connectable to a positive line, a second contact is connectable to a negative line and a third contact is connectable to a dimming control line. Thus, for example, contacts 24*a* and 24*d* may each be connectable to a respective distinct positive line, contacts 24*b* and 24*e* may each be connectable to a respective distinct negative line, and contacts 24*c* and 24*f* may each be connectable to a respective distinct dimming control line.

As illustrated in the example of FIG. 6, cover 18 is formed of two separate pieces 19*c*, 19*d*. Each of pieces 19*c*, 19*d* forms one half of cover 18 and includes part of base 19*b* and two of prongs 19*a*—one prong 19*a* for connecting to side 42 of casing 20 and one prong 19*a* for connecting to side 44 of casing 20. Each of pieces 19*c*, 19*d* includes a notch 19*e*. When pieces 19*c*, 19*d* are installed on connector 14, notches 19*e* together form a hole of cover 18 receiving and surrounding support section 16. Walls 32, 34 each includes two slots 35 extending therein in direction D3 (FIG. 2) that are recessed away from respective surfaces 32*a*, 34*a* in direction D2 for receiving a respective one of prongs 19*a*. To install cover 18 on casing 20, prongs 19*a* of piece 19*c* may first be pressed into slots 35 until prongs 18*a* snap into place on walls 32, 34 and piece 19*c* is removably fixed to casing 20, then prongs 19*a* of piece 19*d* may be pressed into slots 35 until prongs 19*a* snap into place on walls 32, 34 and piece 19*d* is removably fixed to casing 20.

Figure 7:
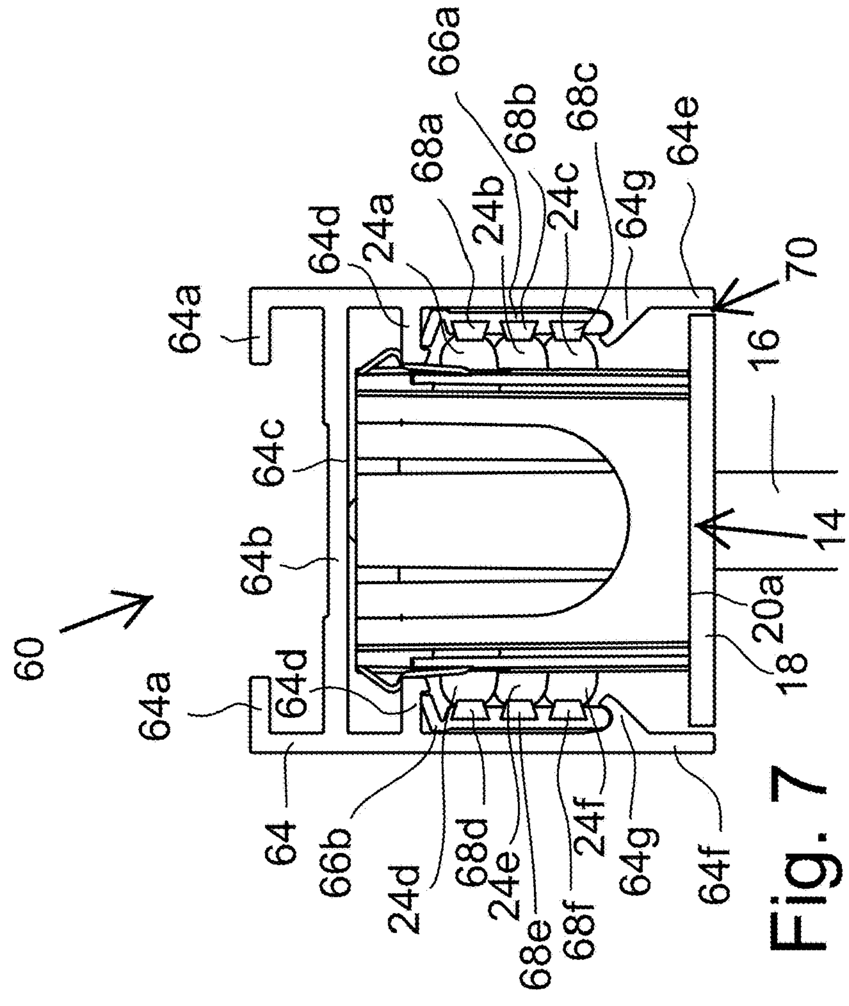
FIG. 7 shows a rail system in accordance with one example of the present disclosure.

FIG. 7 shows a cross-sectional side view of a track lighting system 60 in accordance with an example of the present disclosure. Tracking lighting system 60 includes the connecter 14 inserted inside of a track 62. Track 62 includes a frame 64, which may for example be formed of aluminum, insulating layers 66*a*, 66*b* held by frame 64 and a plurality of electrical contact lines 68*a* to 68*f* held by layers 66*a*, 66*b*. Lines 68*a* to 68*c* form a first electrical circuit and are held on one side of track 62 by insulating layer 66*a* and lines 68*d* to 68*f* form a second electrical circuit and are held on the other side of track 62 by insulating layer 66*b*. Each of lines 68*a* to 68*c* is at a different respective height and each of lines 68*d* to 68*f* is at a different respective height. Each set of lines 68*a* to 68*c* and 68*d* to 68*f* includes a positive line, a negative line and a dimming control line. Thus, for example, lines 68*a* and 68*d* may each be a respective distinct positive line, lines 68*b* and 68*e* may each be a respective distinct negative line, and lines 68*c* and 68*f* may each be a respective distinct dimming control line. In the example of FIG. 7, contacts 24*a* to 24*c* are in contact with lines 68*a* to 68*c* for transmitting electricity to power the light source of light assembly 10 when selected and contacts 24*d* to 24*f* are in contact with lines 68*d* to 68*f* for transmitting electricity to power and control the light source of light assembly 10. If two light assemblies 10 are inserted inside and thus connected to track 62 longitudinally offset from each other, one light assembly may be powered and controlled by lines 68*a* to 68*c* and the other light assembly may be powered and controlled by lines 68*d* to 68*f*.

Frame 64 includes flanges 64*a* configured for connecting to a support surface such as a ceiling and a base 64*b* formed by a horizontally extending wall defining a top surface of a 64*c* of a channel 70 defined by frame 64. One opposite sides of channel 70, frame 64 includes support rails 64*d* for holding clips 22 vertically in place inside of track 62. As connector 14 is pressed upward into track 62, clips 22 contact support rails 64*d* and are forced inward into respective slots 32*b*, 26*d* or slots 34*b*, 26*e*, until the noses of clip 22 are above the support rails 64*d* and thus snap into place to hold connector 14 inside of track 62. Frame 64 further includes two vertically extending side walls 64*e*, 64*f* extending downward from base 64*b* and laterally delimiting channel 70 therebetween. Each side wall 64*e*, 64*f* is provided with a support section 64*g* supporting a lower side of the respective insulating layer 66*a*, 66*b*. An upper side of each of insulating layers 66*a*, 66*b* is held by a lower side of the respective support rail 64*d*.

When connector 14 is inserted inside of track 62, cover 18 closes off the channel 70 in the region of connector 14, such that connector 14 is sandwiched vertically between cover 18 and base 64*d*. Side walls 64*e*, 64*f* have a greater height than connector 14 such that walls 64*e*, 64*f* extend vertically downward past lower surface 20*a* of casing 20 of connector 14.

Figure 8:
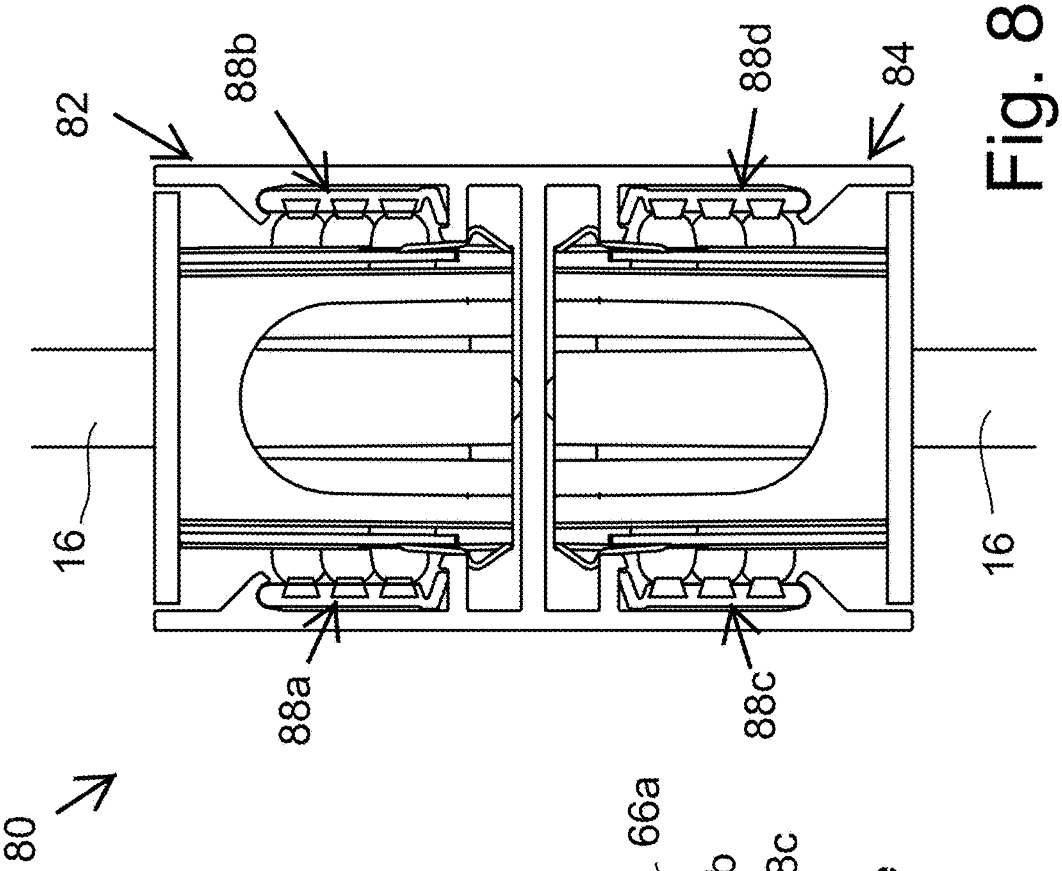
FIG. 8 shows a rail system in accordance with another example of the present disclosure.

FIG. 8 shows a cross-sectional side view of a track lighting system 80 in accordance with another example of the present disclosure. Tracking lighting system 80 includes two separate tracks 82, 84, with each of tracks 82, 84 being configured in the same manner as track 60, with the exception being that tracks 82, 84 share a base wall 86. Track lighting system 80, due to the dual tracks 82, 84, includes four separate and distinct circuits 88*a*, 88*b*, 88*c*, 88*d* that are configured for powering and controlling light assemblies separately and distinctly from each other. For example, connectors 14 of two different light assemblies 10 may be provided in track 82, with one of the light assemblies 10 being powered and controlled by circuit 88*a* and the other light assembly 10 being powered and controlled by 88*a*, and connectors 14 of two different light assemblies 10 may be provided in track 84, with one of the light assemblies 10 being powered and controlled by circuit 88*c* and the other light assembly 10 being powered and controlled by 88*d*. Tracking lighting system 80 may include a stem or aircraft cable integrated on the upper side to mount it to the ceiling in open gaps between connectors 14.

Figure 9:
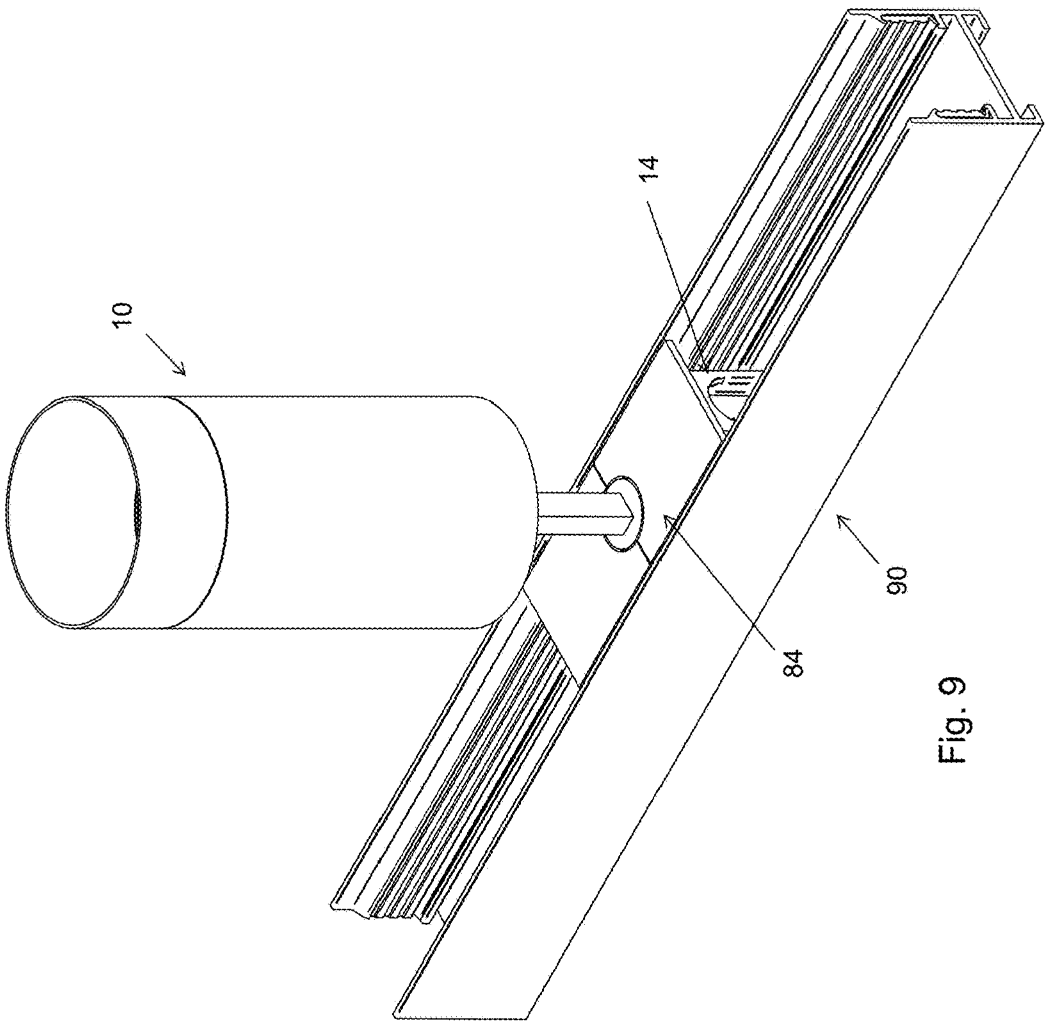
FIG. 9 shows the light assembly of FIGS. 1 to 6 connected to a straight track.

FIG. 9 shows light assembly 10 connected to a straight track 90, with connector 14 being inserted into track 90 and covered with cover 18. Track 90 has the same design as track 62 discussed with respect to FIG. 7.

Figure 10:
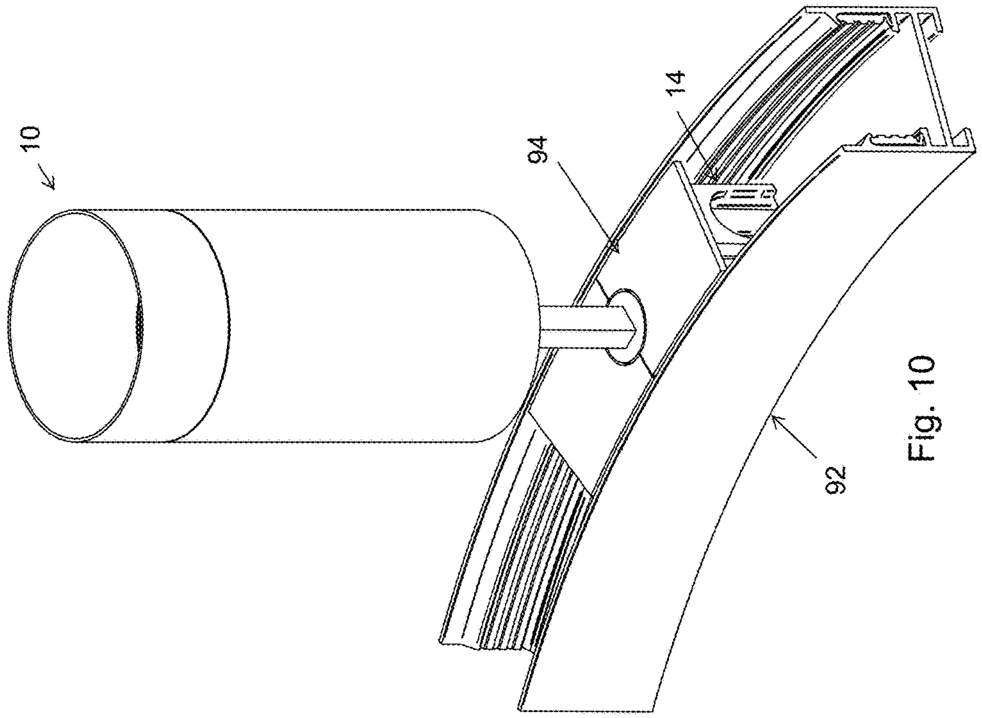
FIG. 10 shows the light assembly of FIGS. 1 to 6 connected to a curved track.

FIG. 10 shows the light assembly 10 connected to a curved track 82, with connector 14 being inserted into track 92 and covered with an arc shaped cover 94. Track 82 has the same design as track 62 discussed with respect to FIG. 7, except that track 82 has a curved shape, with vertically extending side walls 64*e*, 64*f* in FIG. 7 being replaced by a vertically extending side wall 92*a* having a concave shape while extending longitudinally and a vertically extending side wall 92*b* having a convex shape while extending longitudinally, and with horizontally extending base wall 64*b* in FIG. 7 being replaced by horizontally extending base wall 92*c* having an arc shape while extending longitudinally. As noted above, the shaped of casing 20 allows connector 14 to be used with both the straight track 90 and the curved track 92. Arc shaped cover 94 is formed in the same manner as cover 18, with two separate pieces, each having four prongs 19*a* for snapping onto casing 20.

A method of using the lighting assembly 10 may include inserting the light assembly connector 14 into curved lighting track 92 and moving the light assembly connector 14 along curved lighting track and powering the light source of lighting assembly 10 via the curved lighting track 92. The method can then include inserting the light assembly connector 14 into straight lighting track 90 and moving the light assembly connector 14 along the straight lighting track 90 and powering the light source of the lighting assembly 10 via the straight lighting track 90.

Using connector 14 with a straight track 90 involves removably connecting cover 18 to connector 14 after connector 14 is preassembled with support section 16 and light receptacle 12, and using connector 14 with a curved track 92 involves removably connecting cover 94 to connector 14 after connector 14 is preassembled with support section 16 and light receptacle 12. The two piece design of covers 18, 94 allows such installation after preassembly of light receptacle 12, connector 14 and support section 16.

The preceding specification refers to specific exemplary embodiments and examples. It will, however, be evident that various modifications and changes may be made thereto without departing from the broader spirit and scope as set forth in the claims that follow. The specification and drawings are accordingly to be regarded in an illustrative manner rather than a restrictive sense.

What is claimed is:

1. A lighting assembly connector configured for being inserted into a curved lighting track, the lighting assembly connector comprising:

a casing having a width defining a lateral direction and a length defining longitudinal direction, the length being greater than the width, the casing being definable as including three sections each defining one-third of the length, the three sections including a middle section, a first end section including a first longitudinal end of the casing and a second end section including a second longitudinal end of the casing, the casing being electrically insulating, the casing including a first side defining an end face of the lighting assembly connector for facing away from a light source connected to the lighting assembly connector;

a plurality of electrical contacts extending out of the casing each configured for contacting a respective line of the curved lighting track; and at least one fastener connected to the casing configured for removably connecting the lighting assembly connector to the curved lighting track.

2. The lighting assembly connector as recited in claim 1 wherein the lighting assembly connector is configured such that the lighting assembly connector is connectable to the curved lighting track by the at least one fastener by pressing of the lighting assembly end face-first into the curved lighting track.

3. The lighting assembly connector as recited in claim 1 wherein the casing includes three longitudinally extending sides extending between the first longitudinal end and the second longitudinal end, the three longitudinally extending sides including the first side, the three longitudinally extending sides further including second and third sides defining lateral sides of the lighting assembly connector, at least one of the second and third sides having a tapered shape for allowing the lighting assembly connector to be inserted into the curved lighting track.

4. The lighting assembly connector as recited in claim 3 wherein the second and third sides are each tapered from the middle section to both the first longitudinal end and the second longitudinal end.

5. The lighting assembly connector as recited in claim 3 wherein the tapering of the at least one of the second and third sides is formed by a convex shape of the at least one of the second and third sides.

6. The lighting assembly connector as recited in claim 3 wherein the second side includes some of the electrical contacts and the third side includes some of the electrical contacts.

7. The lighting assembly connector as recited in claim 6 wherein the electrical contacts of the second side protrude from the casing at different heights and the electrical contacts of the third side protrude from the casing at different heights.

8. The lighting assembly connector as recited in claim 6 wherein the electrical contacts of the second side define a first circuit for powering and controlling a light source connected to the lighting assembly connector and the electrical contacts of the third side define a second circuit for powering and controlling the light source connected to the lighting assembly connector separately and distinctly from the first circuit.

9. The lighting assembly connector as recited in claim 8 wherein each of the first and second circuits includes an electrical contact for connecting to a negative line, an electrical contact for connecting to a positive line and an electrical contact for connecting to a dimming control line.

10. The lighting assembly connector as recited in claim 8 further comprising a switch for switching between the first circuit and the second circuit.

11. A lighting assembly comprising:

the lighting assembly connector as recited in claim 1; and a first cover configured connected to the casing of the lighting assembly connector.

12. The lighting assembly as recited in claim 11 wherein the first cover has an arc shaped base.

13. A lighting assembly comprising:

the lighting assembly connector as recited in claim 1; and a light receptacle connected to the lighting assembly connector, the light receptacle receiving a light source.

14. A track lighting system comprising:

the light assembly as recited in claim 13; and the curved lighting track configured for connecting to the electrical contacts to power the light assembly; and the light assembly connector being connectable to the curved lighting track.

15. A method of using a lighting assembly connector configured for being inserted into a curved lighting track, the lighting assembly connector comprising:

a casing having a width defining a lateral direction and a length defining longitudinal direction, the length being greater than the width, the casing including a first side defining an end face of the lighting assembly connector for facing away from a light source connected to the lighting assembly connector;

a plurality of electrical contacts extending out of the casing each configured for contacting a respective line of the curved lighting track or the straight lighting track; and at least one fastener connected to the casing configured for removably connecting the lighting assembly connector to the curved lighting track or the straight lighting track, the method comprising:

inserting the light assembly connector into the curved lighting track, the curved lighting track including a base wall and two side walls extending away from the base wall, the inserting of the light assembly connector including pressing the first side of the light assembly connector in between the side walls and toward the base wall of the curved lighting track; and powering the light source via the curved lighting track.

16. The method as recited in claim 15 further comprising connecting an arc shaped cover to the lighting assembly connector.

* * * * *